(12) United States Patent
Usanga et al.

(10) Patent No.: US 9,701,185 B1
(45) Date of Patent: Jul. 11, 2017

(54) AUTOMOBILE COVER

(71) Applicants: Jacob M. Usanga, Halifax (CA);
Toromfon Usanga, Halifax (CA)

(72) Inventors: Jacob M. Usanga, Halifax (CA);
Toromfon Usanga, Halifax (CA)

( * ) Notice: Subject to any disclaimer, the term of this patent is extended or adjusted under 35 U.S.C. 154(b) by 0 days.

(21) Appl. No.: 15/096,906

(22) Filed: Apr. 12, 2016

Related U.S. Application Data

(60) Provisional application No. 62/146,612, filed on Apr. 13, 2015.

(51) Int. Cl.
*B60J 11/02* (2006.01)
*B60J 11/04* (2006.01)

(52) U.S. Cl.
CPC ................ *B60J 11/02* (2013.01); *B60J 11/04* (2013.01)

(58) Field of Classification Search
CPC . B60J 11/00; B60J 11/02; B60J 11/025; B60J 11/04
USPC .............. 296/136.04, 136.07, 136.1, 136.11, 296/136.13
See application file for complete search history.

(56) References Cited

U.S. PATENT DOCUMENTS

| | | | | |
|---|---|---|---|---|
| 2,666,840 A | * | 1/1954 | Poirier | H05B 3/342 135/115 |
| 2,849,012 A | * | 8/1958 | Cohen | B60J 11/00 135/119 |
| 3,021,894 A | * | 2/1962 | La Due | B60J 11/02 160/23.1 |
| 4,657,298 A | | 4/1987 | O | |
| 4,720,135 A | | 1/1988 | Farina | |
| 4,834,446 A | * | 5/1989 | Tung-Chow | B60J 11/02 135/88.05 |
| 4,848,823 A | * | 7/1989 | Flohr | B60J 11/02 160/310 |
| 4,973,100 A | * | 11/1990 | Yang | B60J 11/00 150/166 |
| 5,029,933 A | * | 7/1991 | Gillem | B60J 11/00 150/166 |
| 5,088,788 A | * | 2/1992 | Moulton | B60J 11/00 150/166 |
| 6,092,857 A | * | 7/2000 | Rivas | B60J 11/00 296/136.04 |
| 6,964,446 B2 | * | 11/2005 | Porter | B60J 11/02 150/166 |
| 6,981,509 B2 | * | 1/2006 | Sharapov | B60J 11/02 114/361 |

(Continued)

FOREIGN PATENT DOCUMENTS

EP 1985486 A1 10/2008

*Primary Examiner* — H Gutman
(74) *Attorney, Agent, or Firm* — Robert C Montgomery; Montgomery Patent & Design, LP.

(57) ABSTRACT

An automobile cover is adapted to protectively cover the windows, the hood, the roof, and some portion of the trunk of an automobile to obviate the need to manually remove frost, snow, or ice which may have accumulated on those surfaces while the automobile is parked. The automobile cover can be deployed from a storage area attached to the interior of a trunk in anticipation of frigid weather precipitation, and removably secured to the automobile. Prior to the subsequent operation of the automobile, the automobile cover would be retracted to the storage configuration, whereupon the accumulated precipitation would be shed from both the automobile cover and the automobile.

16 Claims, 4 Drawing Sheets

(56) References Cited

U.S. PATENT DOCUMENTS

| | | | |
|---|---|---|---|
| 7,243,975 B2* | 7/2007 | Harcourt | B60J 11/00 296/136.01 |
| D665,334 S | 8/2012 | Lien | |
| 2001/0038226 A1* | 11/2001 | Hoenack | B60J 11/06 296/136.1 |
| 2001/0045760 A1* | 11/2001 | Syron | B05B 15/0456 296/136.1 |
| 2002/0105207 A1* | 8/2002 | McGrath, Jr. | B60J 11/00 296/136.1 |
| 2009/0102230 A1 | 4/2009 | Pehrson | |
| 2010/0200180 A1 | 8/2010 | Lien | |
| 2010/0206442 A1 | 8/2010 | Koltun | |
| 2012/0261940 A1* | 10/2012 | Gees | B60J 11/025 296/136.04 |
| 2013/0214554 A1* | 8/2013 | Taylor | B60J 11/02 296/136.01 |
| 2013/0300149 A1* | 11/2013 | Dao | B60J 11/02 296/136.04 |
| 2014/0167444 A1 | 6/2014 | DiDato | |
| 2015/0076857 A1* | 3/2015 | Iifliyandskyi | B60J 11/02 296/180.1 |
| 2015/0367717 A1* | 12/2015 | Hu | B60J 11/04 296/136.04 |

* cited by examiner

AUTOMOBILE COVER

RELATED APPLICATIONS

The present invention was first described in and claims the benefit of U.S. Provisional Application No. 62/146,612, filed Apr. 13, 2015, the entire disclosures of which are incorporated herein by reference.

FIELD OF THE INVENTION

The present invention relates generally to an automobile cover adapted to protective a majority of an outer surface of an automobile.

BACKGROUND OF THE INVENTION

Maintaining clean automobile windows is a necessary step an automobile driver must take in ensuring safe automobile operation. However, this task is made exceedingly difficult in those areas where cold weather seasons exist. While windshield wipers, washing fluid and defrosters do an adequate job of keeping the windshield area clean while driving, they cannot quickly or easily cope with thick frost, ice and snow buildup that may accumulate while the automobile is parked.

Weather events such as the above require the driver to get out an ice scraper and physically remove the buildup or warm up the automobile while parked wasting fuel and time. Rather than waste fuel and time, the driver must often resort to physical removal of the frost, ice or snow. Resorting to this removal option is not a pleasant task in freezing temperatures, as even gloved hands quickly become numb. As a result, many drivers only clear a small spot on the windshield, directly in front of the driver's seat and just barely enough to navigate.

This minimal amount of clear sight results in a dangerous driving condition, not only for the driver, but any others who may be sharing the road with them. Accordingly, a need has arisen for a means by which motorists can protect all automobile windows from the ravages of winter weather in a simple and easy manner. The use of the automobile cover allows drivers in cold weather climates to be assured of clear windows at all times without the normal time and energy associated with conventional ice scrapers or pre-automobile operation engine warming in a manner which is quick, easy, and effective.

SUMMARY OF THE INVENTION

The present invention advantageously fills the aforementioned deficiencies by providing a protective cover, comprising a canopy which has a plurality of apertures that are adjacent to a perimeter edge of the cover and a tail having a tail aperture which is located at the distal end of the tail. The cover also has a retraction device which is operably attached to the tail and a plurality of resilient cords with each cord having a hook at each distal end. With respect to each cord, one (1) hook is capable of being secured to an individual aperture of the canopy while the other hook is capable of being secured to a frame member of an automobile. The canopy is configured to cover at least a portion of external surfaces of the automobile. The retraction device selectively deploys or retracts the canopy either manually or by use of an electric motor.

The retraction device may comprise a first cache half, a second cache half which is removably secured to the first cache half, a reel comprising a reel shaft which has a splined cavity and is capable of being in mechanical communication with the reel, a crank and an opening vertically disposed within the second cache half. The canopy is in mechanical communication with the reel and when actuated by the crank, the canopy is selectively deployed or retracted through the opening.

The retraction device may also comprise a pair of trunnions, each of which is centrally positioned on an outside face of the reel, a first bearing, a second bearing, a first cradle half centrally positioned on a top surface of the first cache half, a second cradle half centrally positioned on a top surface of the second cache half, a third cradle half centrally positioned on a bottom surface of the first cache half, a fourth cradle half centrally positioned on a bottom surface of the second cache half, a leader secured at a first end to the reel shaft of the reel and a hook secured to a second end of the leader.

The first cradle half and the second cradle half are capable of retaining the first bearing secured about the first trunnion when the first cache half and a second cache half are secured together. Likewise, the third cradle half and the fourth cradle half are capable of retaining the second bearing secured about the second trunnion when the first cache half and a second cache half are secured together. When the hook is secured within the aperture of the tail, the canopy is capable of being operably controlled by the crank.

The first and second cache halves each may also comprise a pair of support rod ears extending away each cache half. The crank may also comprise a handle, a splined shaft and an arm which is horizontally disposed between the splined shaft and the handle. The handle is perpendicularly secured to a first end of the arm while the splined shaft is perpendicularly secured to a second end of the arm in a direction opposite to that of the handle. When the splined shaft is secured within the splined cavity, the crank operably controls the reel.

The crank may also comprise a spinner which is disposed about the handle, thereby facilitating free rotation of the crank. The canopy may comprise of a foldable durable heavy millimeter polymer film and the plurality of cords may individually comprise a multi-filament elastomer which has an elastic covering. Each canopy and tail aperture comprises a grommet.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY 10 automobile cover
20 canopy
25 perimeter
30 aperture
35 grommet
40 resilient cord
45a first hook
45b second hook
50 tail
60 retraction device
65 reel
67 reel shaft
70 tail hook
75 leader
77 leader to reel shaft attachment
80 trunnion
85 splined cavity
90 first cache half
91 second cache half
95 opening
100 fastener
105 first cradle half
106 second cradle half
107 third cradle half
108 fourth cradle half
110 bearing
115 crank
117 crank aperture
120 arm
125 handle
130 spinner
135 splined shaft
140 support rod
145 support rod ears
150 automobile

DETAILED DESCRIPTION OF THE PREFERRED EMBODIMENT

The best mode for carrying out the invention is presented in terms of its preferred embodiment, herein depicted within FIGS. 1 through 5. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope.

The terms "a" and "an" herein do not denote a limitation of quantity, but rather denote the presence of at least one (1) of the referenced items.

The present invention describes an automobile cover (herein referred to as the "apparatus") 10, which provides a means to easily remove frost, snow, and ice which can accumulate on the windows and the horizontal surfaces of an automobile 150 during a period of disuse in a frigid climate. A canopy 20 would be routinely deployed, via a retraction device 60, over some portion of the automobile 150 from first and second cache halves 90, 91 and removably attached to the automobile 150 by means of a plurality of resilient cords 40 at the initiation of a rest period. Prior to the subsequent use of the automobile 150, the canopy 20 is retracted into the first and second cache halves 90, 91 resulting in the sloughing of any accumulation ice, snow, or frost. The preferred embodiment of the apparatus 10 is presented as a retrofit for an existing automobile 150 that may require some assembly by a qualified provider of such services. However, it can be seen that the present apparatus 10 can easily be incorporated into the design of any automobile 150 without limiting the scope of the invention. It should also be understood that the apparatus 10 may be adapted to span virtually any object in addition to a mode of transportation and accomplish the intended purpose without limiting the scope of the apparatus 10 or the protection herein granted.

Figure 1:
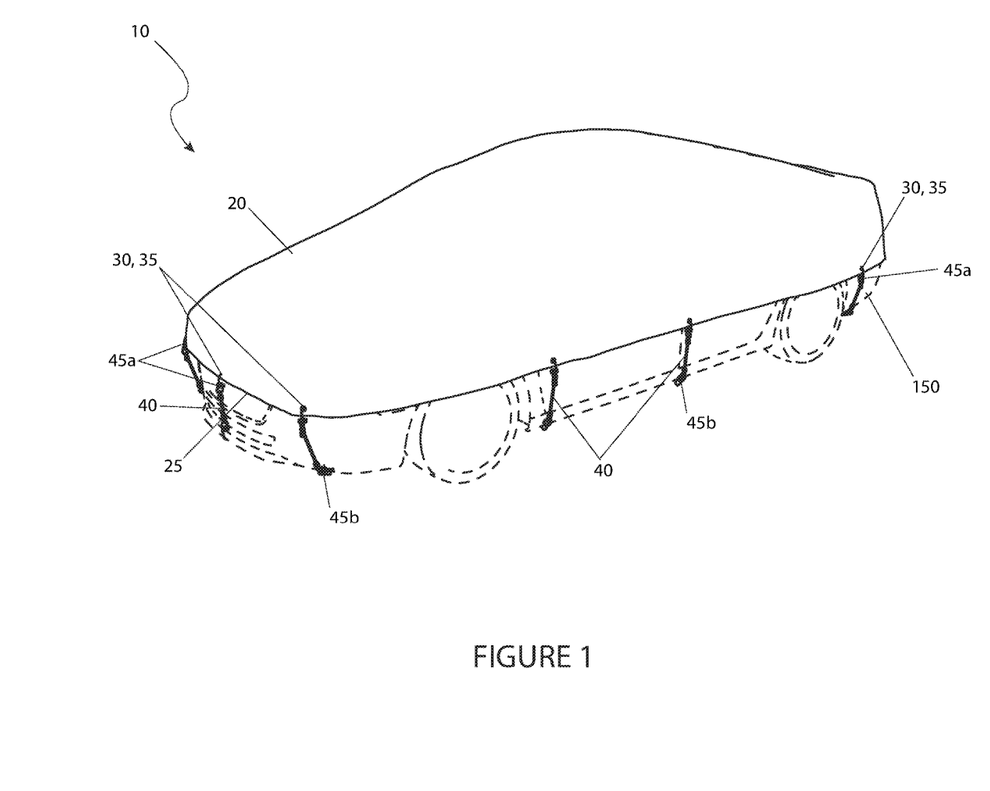
FIG. 1 is an isometric view of an automobile cover 10 deployed on an automobile in accordance with the preferred embodiment of the present invention.

Referring now to FIG. 1, an isometric view of the apparatus 10 according to the preferred embodiment of the present invention, is disclosed. The apparatus 10 includes a canopy 20 and a manual retraction device 60. The canopy 20 is envisioned to be composed of a rectangular, heavy-mil polymer film or equivalent foldable and weather tolerant material which may be formulated to include certain additives to lower the surface friction properties thereof. The canopy 20 is provided with a plurality of apertures 30 uniformly spaced about the perimeter 25. The apertures 30 are reinforced with metal or rigid polymer grommets 35 to resist tearing the material of the canopy 20. The apertures 30 are provided for the removable attachment of the canopy 20 to the automobile 150. In use, the canopy 20 is retained on the automobile 150 with a plurality of resilient cords 40. The resilient cords 40 are provided with a formed "J"-shaped first hook 45a at a first end and a similarly configured second hook 45b at an opposite end. The hooks 45a, 45b may take any form and be attached to the resilient cord 40 by any means without limiting the scope of the apparatus 10. The resilient cords 40 are composed of a multi-filament elastomer with a woven, flexible synthetic covering, such as nylon, or the like, to resist abuse. An open end of a first hook 45a is inserted into the grommet 35 in an aperture 30 of the canopy 20, while the second hook 45b at the opposite end of the resilient cord 40 is hooked to a convenient frame member, or a substantial body member, of the automobile 150. This method of attachment is intended to spread the canopy uniformly over the body of the automobile 150 to protectively cover the roof, the windows, and portions of the rear and sides of the automobile 150. This method of deployment of the canopy 20 will obviate the formation of ice and frost on the windows and prevent any falling snow from directly contacting those components of the automobile 150 covered by the canopy 20. It is envisioned that the canopy 20 may be presented in a variety of lengths and widths to adequately cover a broad range of automobiles 150 and other suitable applications.

Figure 2:
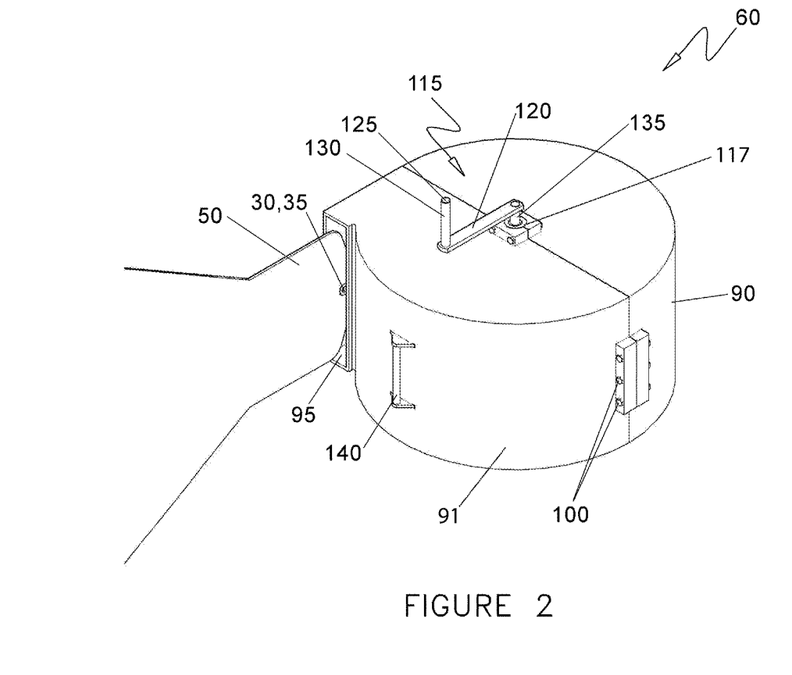
FIG. 2 is an isolated top side view of a retraction device 60 of the automobile cover 10 in accordance with the preferred embodiment of the present invention.
Figure 3:
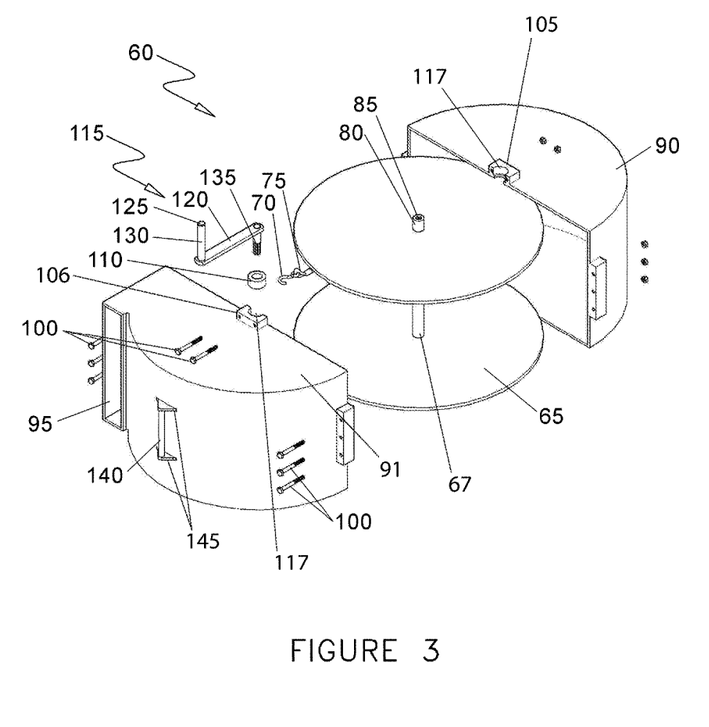
FIG. 3 is an exploded view of the retraction device 60 in accordance with the preferred embodiment of the present invention.
Figure 4:
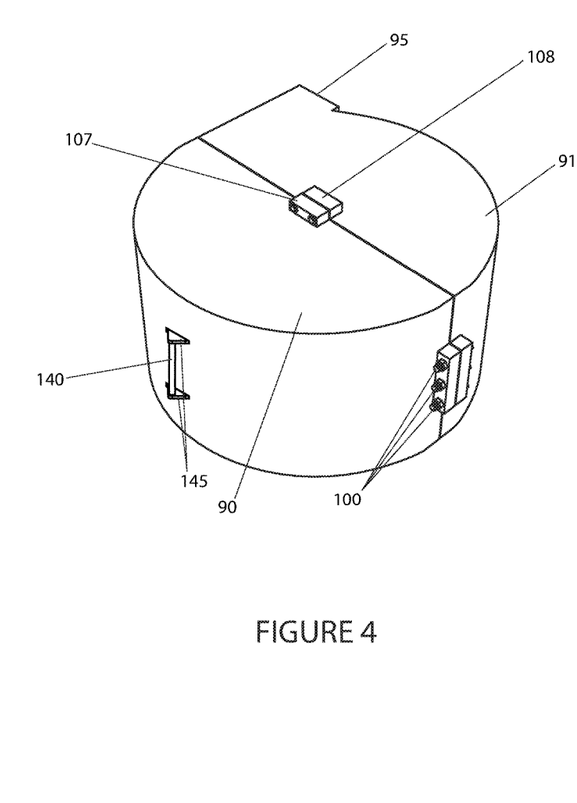
FIG. 4 is an isolated bottom side view of a retraction device 60 of the automobile cover 10 in accordance with the preferred embodiment of the present invention; and, FIG. 5 is an isolated view of a reel 65 of a retraction device 60.
Figure 5:
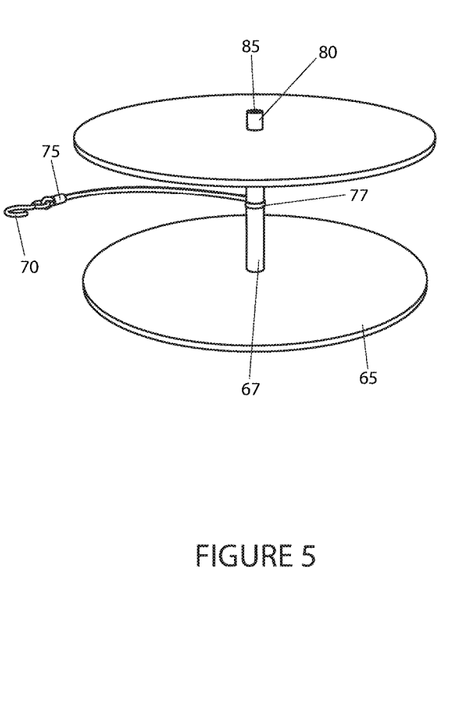

Referring now to FIGS. 2 and 4, isolated views of the retraction device 60, FIG. 3, an exploded view of the retraction device 60 of the apparatus 10, and FIG. 5, an isolated view of the reel 65 according to the preferred embodiment of the present invention, are disclosed. The retraction device 60 includes a crank 80 operated reel 65 upon which the canopy 20 is gathered for storage, and the first and second cache halves 90, 91. The first and second cache halves 90, 91 are configured to be a hollow, generally cylindrical housing, into which the canopy 20 is collapsed after each use. The first and second cache halves 90, 91 are constructed of a plurality of injection-molded thermoplastic pieces to form a storage compartment for the canopy 20. The canopy 20 is provided with a tail 50 along some portion of the perimeter 25 which comprises a preferential attachment point to the reel 65. The tail 50 is configured to be a tapered formation along the perimeter 25 of the canopy 20. At least one (1) grommet 35 reinforced aperture 30 is disposed in the tail 50 in order to be connected to a tail hook 70 attached to the reel 65 by means of a leader 75 which is secured to the reel shaft 67 by a leader to a reel shaft attachment 77. The reel 65 is configured to be a cylindrical shaft provided with a pair of lateral disks upon which the canopy 20 is stored. The lateral disks of the reel 65 maintain the wound canopy 20 in a stacked configuration to obviate any interference with the interior of the first and second cache halves 90, 91. The reel shaft 67 comprises trunnions 80 upon which the reel 65 rotates. The trunnions 80 are provided with annular bearings 110 which are correspondingly retained in the first and second cradle halves 105, 106 and third and fourth cradle halves 107, 108 of the first and second cache halves 90, 91. The first and second cache halves 90, 91 are split along a centerline so as to accomplish the proper assembly of those components disposed within. The first and second cradle halves 105, 106 and third and fourth cradle halves 107, 108 form an aperture by the meeting of the first and second cache halves 90, 91 for the retention of the trunnions 80 of the reel 65 while permitting the requisite rotary motion of the reel 65 for gathering and playing out the canopy 20. Additionally, the first and second cradle halves 105, 106 form a crank aperture 117 permitting the insertion of a crank 115. The third and fourth cradle halves 107, 108 are configured without a crank aperture 117 thereby forming a sealed exterior when the first and second cache halves 90, 91 are secured together.

The retraction device 60 is much narrower than the width of the automobile 150; therefore, the canopy 20 must be drawn into a folded configuration to be wound upon the reel 65 for storage. The tail 50 is the approximate width of the retraction device 60 and thus initiates the folding process. The leader 75 is a flexible connector between the reel shaft 67 of the reel 65 and the tail 50 of the canopy 20. The leader 75 is preferably some length of natural, or synthetic twisted rope. Other materials, such as a strap, or a chain, may also be utilized without limiting the scope of the apparatus 10.

The second cache half 91 is provided with an opening 95 into which the tail 50 of the canopy 20 is introduced to be attached to the reel 65. The opening 95 is configured to be restrictive so as to bias the canopy 20 into a folded configuration and inhibit the entrance of any frozen precipitation. It is envisioned that the opening 95 may be provided with pinch rolls in some embodiments to further assist with the folding and compression of the canopy 20. The first and second cache halves 90, 91 are secured together by means of a plurality of conventional fasteners 100 inserted through aligned apertures disposed in the first and second cache halves 90, 91.

The crank 115 is provided to assist a user to exert sufficient force to induce the rotary motion of the reel 65 required to wind the canopy 20. The reel shaft 67 of the reel 65 is provided with a splined cavity 85 centrally located in that reel shaft 67. The crank 115 is configured to have a complimentary splined shaft 135 which is fitted into that splined cavity 85 of the reel shaft 67. The crank 115 has a moment arm 120 disposed between the splined shaft 135 and a handle 125. This arm 120 translates the forces applied to the handle 125 into a torque for the rotation of the reel 65. A loose fitting spinner 130 is disposed on the handle 125 as a journal bearing to facilitate the smooth turning of the crank 115 during use. It is envisioned that an electric motor may be connected to the reel 65 in some embodiments to obviate the need for a user to employ the hand crank 115. It is also envisioned that the electric motor may be wirelessly actuated.

The first and second cache halves 90, 91 are additionally provided with support rods 140 mounted along the outer circumference of the first and second cache halves 90, 91 respectively. The support rods 140 are configured to be cylindrical bars affixed between projecting support rod ears 145 on each first and second cache halves 90, 91 for the storage of the resilient cords 40 when not in use. The first hook 45a of a resilient cord 40 is looped around one (1) support rod 140 and the resilient cord 40 is stretched around the first and second cache halves 90, 91 so as to attach a second hook 45b to a diametrically opposed support rod 140.

The preferred embodiment of the present invention can be utilized by an enabled individual in a simple and straightforward manner with little or no training After initial purchase or acquisition of the apparatus 10, it would be installed as indicated in FIG. 1. The method of installing and utilizing the apparatus 10 may be achieved by performing the following steps: acquiring a model of the apparatus 10 having a desired size to fit the intended application; installing, or commissioning the installation of the retraction device 60 in an appropriate location; parking the automobile 150; removing the canopy 20 from the storage space within the first and second cache halves 90, 91; disconnecting the tail 50 from the tail hook 70; removing the resilient cords 40 from storage on the support rods 140; spreading the canopy 20 over the automobile in a back to front fashion to cover all of the windows, the roof, the hood, and as much of the rear of the automobile 150 as is possible; utilizing the resilient cords 40 to secure the canopy to the automobile 150 by inserting a first hook 45a into a selected grommet 35 and placing the second hook 45b in a latched position with a portion of the frame, or the body of the automobile 150; allowing the automobile 150 to remain in that frigid climate secure in the knowledge that any accumulation of ice or snow will be sloughed off by the canopy 20.

Prior to the next use of the automobile 150 the resilient cords 40 can be removed from the snow laden automobile 150 to remove the canopy 20 and the snow, ice, or frost reposing thereon. The resilient cords 40 may be attached to the support rods 140 on the first and second cache halves 90, 91 and the canopy 20 can be wound onto the reel 65 of the retraction device 60 for storage until the next use.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:
1. A protective cover, comprising:
   a canopy, having a plurality of apertures adjacent to a perimeter thereof, and a tail having a tail aperture, said tail located at a distal end thereof;
   a retraction device operably attached to said tail, comprising:
   a first cache half;

a second cache half removably secured to said first cache half;
a reel in mechanical communication with said canopy, further having a reel shaft having a splined cavity;
a crank capable of being in mechanical communication with said reel;
an opening vertically disposed within second cache half;
a pair of trunnions, each centrally positioned on an outside face of said reel;
a first bearing;
a second bearing;
a first cradle half centrally positioned on a top surface of said first cache half;
a second cradle half centrally positioned on a top surface of said second cache half;
a third cradle half centrally positioned on a bottom surface of said first cache half;
a fourth cradle half centrally positioned on a bottom surface of said second cache half;
a leader secured at a first end to said reel shaft; and,
a hook secured to a second end of said leader;
wherein said first cradle half and said second cradle half retain said first bearing secured about said first trunnion when said first cache half and a second cache half are secured together;
wherein said third cradle half and said fourth cradle half retain said second bearing secured about said second trunnion when said first cache half and a second cache half are secured together; and,
wherein when said hook is secured within said tail aperture, said canopy is operably controlled by said crank;
wherein when said crank is actuated, said canopy is selectively deployed or retracted through said opening; and,
a plurality of resilient cords each having a first cord hook at a first distal end and a second cord hook at a second distal end;
wherein said first cord hook is capable of securing to an individual aperture of said canopy;
wherein said second cord hook is capable of securing to a frame member of an automobile; and
wherein said canopy is configured to cover at least a portion of external surfaces of said automobile.

2. The cover of claim 1, wherein said first cache half comprises:
a pair of support rod ears extending away therefrom; and,
a support rod affixed at distal ends thereof to said pair of support rod ears.

3. The cover of claim 1, wherein said second cache half comprises:
a pair of support rod ears extending away therefrom; and,
a support rod affixed at distal ends thereof to said pair of support rod ears.

4. The cover of claim 1, wherein said crank further comprises:
a handle;
a splined shaft; and,
an arm horizontally disposed between said splined shaft and said handle;
wherein said handle is perpendicularly secured to a first end of said arm;
wherein said splined shaft is perpendicularly secured to a second end of said arm in a direction opposite to that of said handle; and,
wherein when said splined shaft is secured within said splined cavity, said crank operably controls said reel.

5. The cover of claim 4, wherein said crank further comprises a spinner disposed about said handle, thereby facilitating rotation of said crank.

6. The cover of claim 1, wherein said canopy comprises foldable polymer film.

7. The cover of claim 1, wherein said plurality of cords each comprise a multi-filament elastomer having an elastic covering.

8. The cover of claim 1, wherein each canopy and tail aperture comprises a grommet.

9. A protective cover, comprising:
a canopy, having a plurality of apertures adjacent to a perimeter thereof, and a tail having a tail aperture, said tail located at a distal end thereof;
a retraction device operably attached to said tail, comprising:
a first cache half;
a second cache half removably secured to said first cache half;
a reel in mechanical communication with said canopy, further having a reel shaft having a splined cavity;
a crank capable of being in mechanical communication with said reel;
an opening vertically disposed within second cache half;
a pair of trunnions, each centrally positioned on an outside face of said reel;
a first bearing;
a second bearing;
a first cradle half centrally positioned on a top surface of said first cache half;
a second cradle half centrally positioned on a top surface of said second cache half;
a third cradle half centrally positioned on a bottom surface of said first cache half;
a fourth cradle half centrally positioned on a bottom surface of said second cache half;
a leader secured at a first end to said reel shaft; and,
a hook secured to a second end of said leader;
wherein said first cradle half and said second cradle half retain said first bearing secured about said first trunnion when said first cache half and a second cache half are secured together;
wherein said third cradle half and said fourth cradle half retain said second bearing secured about said second trunnion when said first cache half and a second cache half are secured together; and,
wherein when said hook is secured within said tail aperture, said canopy is operably controlled by said crank;
wherein when said crank is actuated, said canopy is selectively deployed or retracted through said opening; and,
a plurality of resilient cords each having a first cord hook at a first distal end and a second cord hook at a second distal end;
wherein said first cord hook is capable of securing to an individual aperture of said canopy;
wherein said second cord hook is capable of securing to a frame member of an automobile;
wherein said canopy is configured to cover at least a portion of external surfaces of said automobile; and,
wherein said reel is adapted to be in operable communication with an electric motor.

10. The cover of claim 9, wherein said first cache half comprises:
 a pair of support rod ears extending away therefrom; and,
 a support rod affixed at distal ends thereof to said pair of support rod ears.

11. The cover of claim 9, wherein said second cache half comprises:
 a pair of support rod ears extending away therefrom; and,
 a support rod affixed at distal ends thereof to said pair of support rod ears.

12. The cover of claim 9, wherein said crank further comprises:
 a handle;
 a splined shaft; and,
 an arm horizontally disposed between said splined shaft and said handle;
 wherein said handle is perpendicularly secured to a first end of said arm;
 wherein said splined shaft is perpendicularly secured to a second end of said arm in a direction opposite to that of said handle; and,
 wherein when said splined shaft is secured within said splined cavity, said crank operably controls said reel.

13. The cover of claim 12, wherein said crank further comprises a spinner disposed about said handle, thereby facilitating rotation of said crank.

14. The cover of claim 9, wherein said canopy comprises foldable polymer film.

15. The cover of claim 9, wherein said plurality of cords each comprise a multi-filament elastomer having an elastic covering.

16. The cover of claim 9, wherein each canopy and tail aperture comprises a grommet.

\* \* \* \* \*